US006900952B2

(12) United States Patent
Eisenbies et al.

(10) Patent No.: US 6,900,952 B2
(45) Date of Patent: May 31, 2005

(54) SYSTEM AND METHOD FOR REPRODUCIBLY MOUNTING AN OPTICAL ELEMENT

(75) Inventors: Stephen Eisenbies, Livermore, CA (US); Steven Haney, Tracy, CA (US)

(73) Assignee: Sandia National Laboratories, Livermore, CA (US)

(*) Notice: Subject to any disclaimer, the term of this patent is extended or adjusted under 35 U.S.C. 154(b) by 27 days.

(21) Appl. No.: 10/677,820

(22) Filed: Oct. 1, 2003

(65) Prior Publication Data

US 2005/0068641 A1 Mar. 31, 2005

Related U.S. Application Data

(60) Provisional application No. 60/416,159, filed on Oct. 4, 2002.

(51) Int. Cl.[7] ................................................. G02B 7/02
(52) U.S. Cl. ........................ 359/819; 359/813; 359/822
(58) Field of Search ................................ 359/819, 822, 359/813, 814

(56) References Cited

U.S. PATENT DOCUMENTS

| | | | | |
|---|---|---|---|---|
| 3,596,863 A | * | 8/1971 | Kaspareck | .................. 359/871 |
| 4,077,722 A | * | 3/1978 | Bicskei | ...................... 356/127 |
| 4,408,830 A | * | 10/1983 | Wutherich | .................. 359/813 |
| 4,655,548 A | | 4/1987 | Jue | .......................... 350/245 |
| 5,678,944 A | | 10/1997 | Slocum et al. | ................ 403/13 |
| 5,847,885 A | * | 12/1998 | Arnone et al. | .............. 359/818 |
| 5,915,678 A | | 6/1999 | Slocum et al. | ................ 269/47 |
| 6,115,166 A | * | 9/2000 | Kotaki | ....................... 359/212 |
| 6,304,393 B1 | * | 10/2001 | Sechrist et al. | ............. 359/822 |
| 6,550,925 B1 | | 4/2003 | Deschaseaux | .............. 359/872 |
| 6,603,611 B1 | * | 8/2003 | Hookman | .................. 359/811 |
| 6,661,588 B1 | * | 12/2003 | Huang et al. | ............... 359/819 |
| 6,754,013 B2 | * | 6/2004 | Willis | ......................... 359/819 |
| 2002/0097509 A1 | | 7/2002 | Graves et al. | ............. 359/811 |
| 2004/0017619 A1 | * | 1/2004 | Kang | ......................... 359/822 |

OTHER PUBLICATIONS

Layton, C.H.; Slocum, A.H; "Optical design techniques for kinematic couplings" *Precision Engineering*, v.25 (2001) pp. 114–127.
http://pergatory.mit.edu/kinematiccouplings/documents/Theses/culpepper_thesis/quasi_kinematic_couplings.pdf Thesis of Culpepper, M.L.; "Design and Application of Compliant Quasi–Kinematic Couplings" Feb. 2000.
http://pergatory.mit.edu/ajhart/research/mitperg/SMthesis/thesisTOC.html Thesis of Hart, A.J.; "Design and Analysis of Kinematic Couplings for Modular Machine and Instrumentation Structures" Feb. 2002.

* cited by examiner

*Primary Examiner*—Ricky Mack
(74) *Attorney, Agent, or Firm*—Timothy P. Evans (57) ABSTRACT

The present invention provides a two-piece apparatus for holding and aligning the MEMS deformable mirror. The two-piece apparatus comprises a holding plate for fixedly holding an adaptive optics element in an overall optical system and a base spatially fixed with respect to the optical system and adapted for mounting and containing the holding plate. The invention further relates to a means for configuring the holding plate through adjustments to each of a number of off-set pads touching each of three orthogonal plane surfaces on the base, wherein through the adjustments the orientation of the holding plate, and the adaptive optics element attached thereto, can be aligned with respect to the optical system with six degrees of freedom when aligning the plane surface of the optical element. The mounting system thus described also enables an operator to repeatedly remove and restore the adaptive element in the optical system without the need to realign the system once that element has been aligned.

23 Claims, 4 Drawing Sheets

SYSTEM AND METHOD FOR REPRODUCIBLY MOUNTING AN OPTICAL ELEMENT

CROSS REFERENCE TO RELATED APPLICATIONS

This application claims priority to prior co-pending provisional U.S. patent application Ser. No. 60/416,159 originally filed Oct. 4, 2002 entitled "REPEATABLE MOUNT FOR MEMS MIRROR SYSTEM" from which benefit is claimed.

STATEMENT OF GOVERNMENT INTEREST

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

The present invention relates to a two-piece apparatus for fixedly holding an Adaptive Optics ("AO") element in an overall optical system, wherein said AO element may be aligned with respect to said optical system and wherein said aligned AO element may be repeatedly removed and replaced in said optical system without the need for aligning said AO element.

The present invention also relates to a means for spatially aligning the AO element with six degrees of freedom.

The present invention also relates to Micro-ElectroMechanical Systems ("MEMS") and methods for aligning a deformable MEMS micro-mirror array in an optical system.

Mounting systems for use with deformable mirrors are known. See for instance, U.S. Published patent application Ser. No. 20020097509A1, "Mounting Apparatus for a Deformable Mirror", to Graves, et al. However, descriptions of systems that provide the means for repeated replacement and interchangeability of a deformable mirror (MEMS or otherwise) in an optical system without the need to realign the system with each interchange are not known.

DETAILED DESCRIPTION OF THE INVENTION

An adaptive phoropter has been designed that uses deformable micro-mirror technology that provides a means to correct wave front errors caused by high order aberrations in the structures of the human eye. A design requirement for the prototype adaptive phoropter must allow repeated removal and replacement of a MEMS deformable micro-mirror within the system without the need for realignment of the system with each interchange. It is also a design requirement that multiple MEMS deformable mirrors as well as a rigid plane mirror (the alignment master) be interchangeable within the overall optical system without the need to realign the system.

Figure 1:
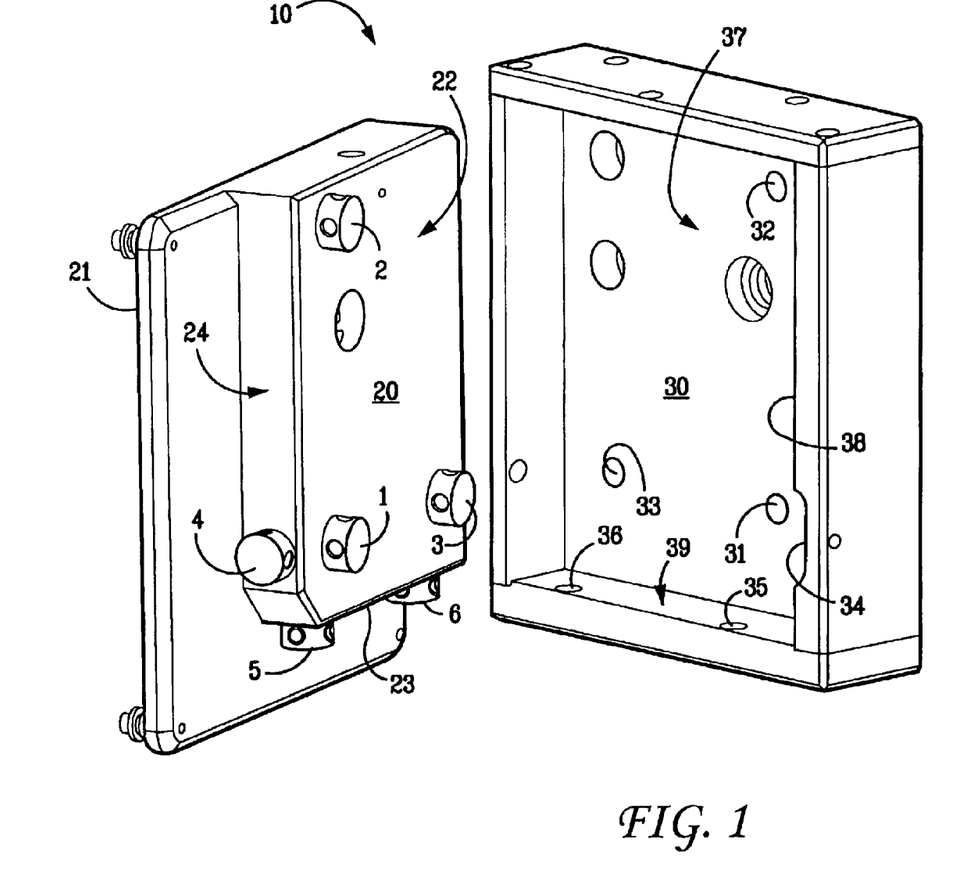
FIG. 1 illustrates an exploded isometric view of the two-piece mirror holding system.

In order to provide this capability, a two-piece mount, or mirror holding system 10, shown in FIG. 1, was constructed for holding and aligning the MEMS deformable mirror. The mirror holding system 10 comprises a backplate 20 that mounts to and interacts with a base 30. Backplate 20 provides a plurality of off-set members on a first surface 21 onto which any commercially available MEMS deformable micro-mirror array chip 12 and circuit board 13 (also known as the "card") may be rigidly mounted. Backplate 20 further includes three sets of six spherical contact pads 1–6 arranged on each of three orthogonal second, third, and fourth surfaces 22–24. The six contact pads are oriented such that two sets of three pads (1, 2, and 5, and 1, 3 and 4) each fall along common perpendicular axes. The contact pads are further arranged such that imaginary axes passing though the lengths of pads 1, 4 and 5, will intersect at a common point, as will similar imaginary axes passing though the lengths of pads 3, and 6. In addition, pad 1 is located on backplate 20 such that the imaginary axis passing through pad 1 also passes through the geometric center of MEMS micro-mirror array 12.

The mirror holding system 10 is completed by mounting backplate 20 into and against base 30 and holding the two parts in place with a spring-loaded fixture (not shown) although any other equivalent means for holding these parts together including an array of magnets, an array of toggle clamps, or a cam locking assembly. Each of the six contact pads 1–6 interface with a corresponding adjacent hard point 31–36 located on three orthogonal surfaces 37–39 on base 30 corresponding to the three orthogonal surfaces on backplate 20.

Figure 2:
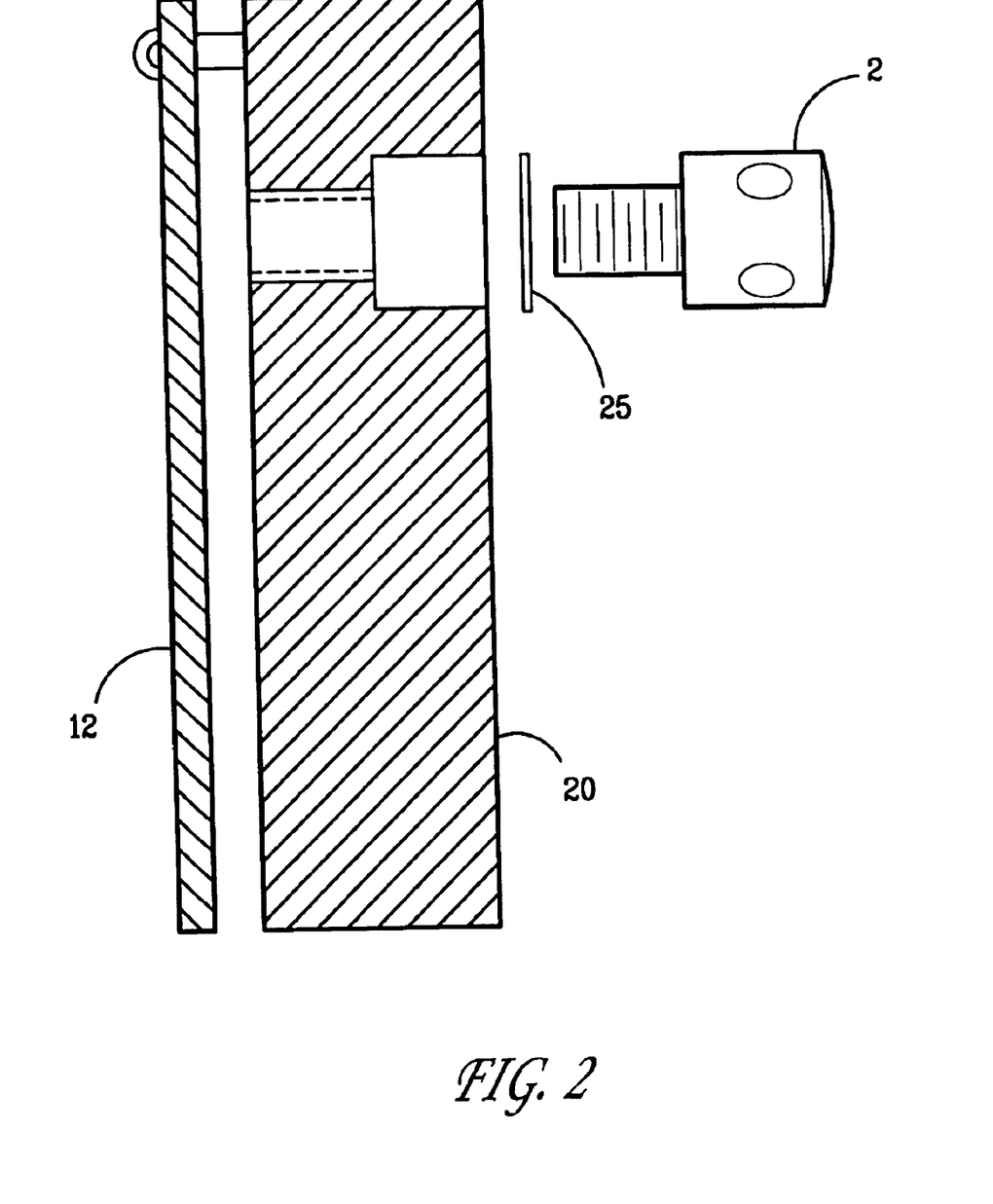
FIG. 2 illustrates a schematic cross-sectional view of one of the six contact pads and its relationship to the backplate and MEMS circuit board.

Mirror holding system 10 operates as follows. Shown in FIG. 3, base 30 is rigidly mounted in a 3-axis translational stage 50 which is itself mounted to an optical bench or "baseplate" 100 (shown in FIG. 4). The circuit board or card 13 carrying the MEMS micro-mirror chip 12 is installed on backplate 20 as described below in the alignment procedures, particularly procedure #7. As shown by way of representation in FIG. 2, each of the six contact pads is screwed into the backplate with various numbers of shim stock 25 to provide for tilting and translating backplate 20 with respect to the base 30 and therefore with respect to the optical system. Shims 25 can be added or removed from under any specific pad in order to provide a known change in the angular or spatial position of the MEMS micro-mirror array chip 12 and circuit board 13.

The adaptive phoropter is initially aligned using backplate 20 mounted with a plane mirror (not shown) installed in place of the MEMS deformable mirror and functions as a "surrogate" MEMS mirror device and serves as a master alignment fixture. Each MEMS deformable mirror backplate assembly 10 is then aligned by adjusting the shims at each contact pad until it matches the master alignment fixture.

Matching the MEMS deformable mirror backplate assemblies to the pre-aligned master provides for interchangeability. Alignment procedures for using assembly 10 are detailed below.

AO System Alignment Procedure #0

Surrogate MEMS Assembly Procedure

A special fixture, hereinafter referred to as a "reticle fixture," has been created to hold a glass reticle with a grid pattern in the same location on an AO system as a MEMS device, such as micro-mirror array chip 12. This item will represent the MEMS device and will be called the surrogate MEMS.

The surrogate MEMS will be used as the reference to which the positioning of the real MEMS devices are compared when they are mounted to the MEMS backplate 20. This provides for interchangeability between multiple MEMS devices without the need to make compensation adjustments to other components of the AO system.

The reticle fixture (not shown) and backplate 20 will be bolted to each other to complete the surrogate MEMS assembly. The reticle is placed in the nominal position and orientation relative to the nominal positions of the contact pads 1–6 on backplate 20. Each of contact pads 1–6 is installed on the backplate with an initial thickness of shims 25 installed under them to place them in their nominal positions.

Throughout the remainder of these procedures multiple interchangeable bases 30 and backplates 20 are utilized. However, where a particular MEMS base is used for alignment purposes it is hereinafter referred to as a "master" base 30$a$.

1.) Align MEMS Backplate to a Traveling Microscope.
  Place MEMS base master 30$a$ on a traveling microscope. The traveling microscope should have a digital readout for x and y position. Incident illumination should be used.
  Using the datum edges 38 and 39 of MEMS base master 30$a$ as references, orient the edges coincident with the axes of the microscope. This is done by tapping lightly and nudging the MEMS base master 30$a$ into place.
  Install backplate 20 in the MEMS base master 30$a$ and lock it in place with spring-loaded plungers (not shown).
  Secure the MEMS base master onto the traveling microscope.
  Translate the traveling microscope to a nominal position of the mirror normal axis and zero the traveling microscope position indicators.

2.) Install the Reticle Fixture and Reticle on the MEMS Backplate
  The reticle fixture is secured to MEMS backplate 20 through three holes using three 4-40 socket head cap screws, #4 lock washers, and #4 flat washers.
  Tighten the 4-40 screws lightly to hold the reticle fixture in place.
  Place a glass reticle (e.g. Edmund p/n A51-015) in the reticle fixture.
  Looking through the microscope, rotate the reticle in the reticle fixture until the reticle grid x and y axes are angularly aligned with backplate 20 edges (already assembled onto base master 30$a$ itself on translation stage 50). Secure reticle position with a fast-setting epoxy.
  Looking through the microscope, nudge or tap the reticle fixture relative to backplate 20 to center the reticle coincident with MEMS device normal axis (already aligned with the microscope axis).
  Double-check the angular orientation of the reticle, making any fine adjustments as needed.
  Tighten the mounting screws for the reticle fixture.
  Recheck the orientation and position of the reticle grid in the microscope.
  There should be no need to make adjustments to the tilt or axial position of the reticle at this time. (These parameters will be accommodated by the positioning of the optics on baseplate 100.)
  Remove and replace the surrogate MEMS to verify repeatable positioning of the reticle grid in MEMS base master 30 while it is still installed on the microscope. Ensure that the six contact pads on the surrogate MEMS are in contact with MEMS base master 30.

AO System Alignment Procedure #1

Establishing the MEMS Micro-mirror Normal Axis

Before placement of the deformable mirror and system optics, it is necessary to define the position of the normal axis of the MEMS device on baseplate 100. The normal axis will be represented by a laser beam set up in the following procedure.

A laser (not shown) is mounted on baseplate 100 having adjustment in x and y translation, and tilt adjustment in pitch and yaw.

The axis will be defined by two known points located on baseplate 100 using specially made alignment targets.

Each target is L shaped, wherein the horizontal portion or "base" sits at datum locations on the surface of baseplate 100, and wherein the vertical portion of the L-shaped target includes a small aperture at the desired beam height above the surface of baseplate 100. When used on baseplate 100 of the present AO system, a pair of ⁵⁄₁₆"Ø shoulder screws are in specific locations on baseplate 100 to place and orient the target into position. This will hold the aperture on the target at a point 3" directly above the surface baseplate 100 and coincident with the direction of the axis.

1) Define the Location of the Center of the Deformable Mirror Surface
  Install the target on an assigned first datum hole located on baseplate 100 by placing the bore of the first target on the assigned datum hole and secure it with shoulder bolts. This datum hole defines the location of the deformable mirror surface as it will be placed on baseplate 100.
  The location of the small aperture at the 3" beam height on the target is designated as the nominal location of the target in the x, y, and z position.

2.) Define a Second Endpoint for the Nominal Mirror Normal Axis.
  A second target is set at the opposite end of baseplate 100. This target will be used to define the opposite end of the normal axis.
  Place the second target on baseplate 100 in the same orientation as the first target located at the position of the MEMS micro-mirror device.
  Locate the second target using two shoulder screws so that the aperture on the second target is coincident with the other end of the nominal normal axis.
  The location of the hole at the 3" beam height defines the second point on the normal axis in x and y position.

3.) Set Up a Laser Beam on the Normal Axis Defined by the Two Targets.
  The line passing through the aperture on each target corresponds to the nominal location of the normal axis of the deformable micro-mirror array 12. A laser beam will be set up that goes through the two apertures on the targets to complete the definition of the MEMS device normal axis on baseplate 100.

Mount a laser beyond the second target so that its beam points in the direction of both targets. The laser should have a mount that provides pitch and yaw tilt adjustments, as well as the capability to translate the beam in the x and y directions. The closer the laser is mounted to the second target, the better.

Using the translation adjustments of the laser mount, bring the laser spot into the aperture of the second target.

Remove the second target, and using the tilt adjustments of the laser mount, bring the laser spot into the aperture of the first target.

Replace the second target and use the laser mount translation adjustments to again bring the laser spot into the aperture of the second target.

Repeat the prior two steps until no further iterations are necessary.

The laser beam is now coincident with the normal axis of the MEMS micro-mirror device.

The target positioned at the location of the MEMS device should not be removed before continuing to the next step.

AO System Alignment Procedure #2

Procedure for Setting the Position and Orientation of a Master Reticle

At this stage a surrogate MEMS assembly will have been assembled in procedure #0 and a normal axis for the MEMS micro-mirror will have been defined on baseplate 100 by alignment procedure #1.

Multiple MEMS micro-mirror assemblies and a surrogate MEMS assembly will be interchangeable in the AO microscope system without the need for adjustments to the alignment. MEMS devices and their mount assemblies will be aligned using baseplate 100 to match the surrogate MEMS, consisting of a grid reticle and an identical interface to the MEMS mount.

1.) Install the MEMS Translator Assembly on the Baseplate

Attach base 30 to the MEMS translator assembly 50.

Install the MEMS translator assembly on baseplate 100.

Figure 3:
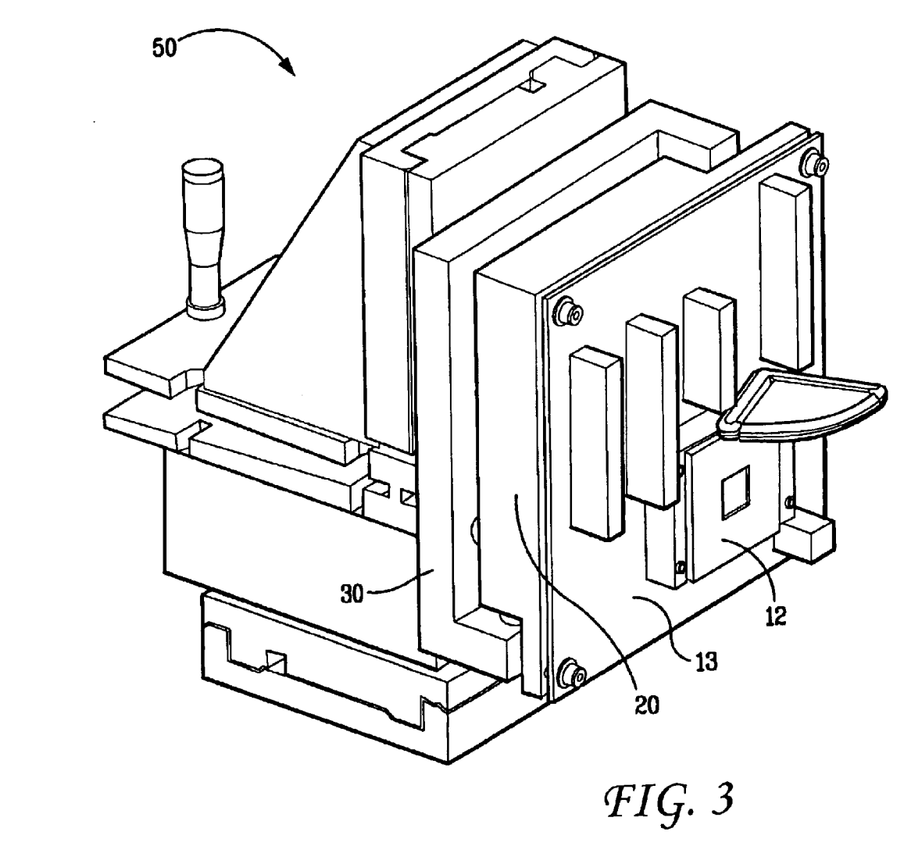
FIG. 3. illustrates an isometric view of the optical mount supporting the mirror holding system/AO element.
Figure 4:
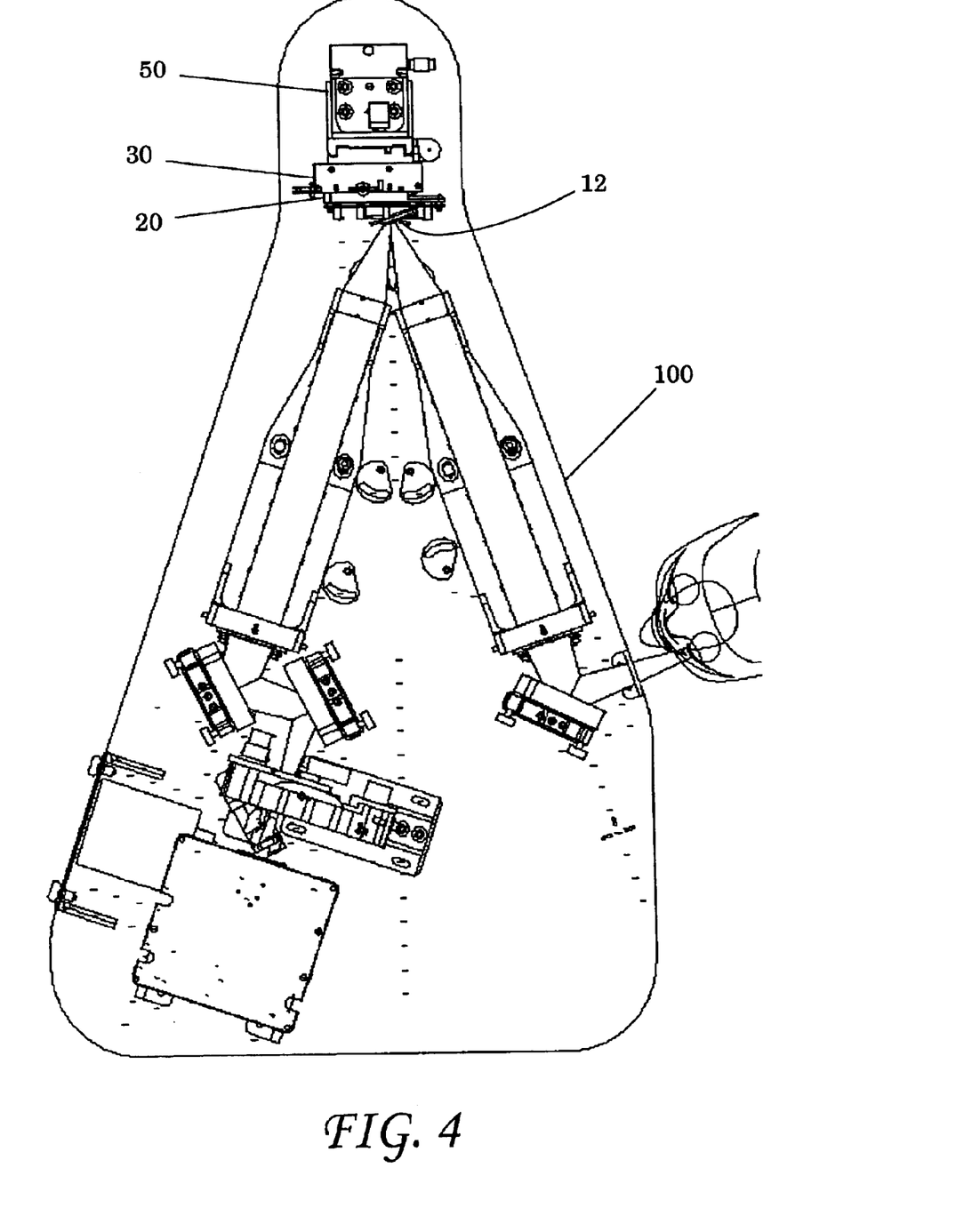
FIG. 4. illustrates an isometric view of the optical mount holding the mirror holding system/AO element.

A mounting system is provided in the MEMS translator assembly 50 that locks backplate 20 holding deformable micro-mirror array 12 or surrogate MEMS in place on base 30. Translator assembly 50 provides course positional adjustments of the MEMS micro-mirror device in the transverse directions parallel to the surface of baseplate 100, and for pitch angular adjustments. The interface between the deformable micro-mirror mount assembly (backplate subassembly) and base 30 allows fine adjustment in six degrees of freedom through the placement of shims strategically placed beneath the contact pads.

2.) Transfer the Reference for the Position of the MEMS Device into the Focal Plane of a CCD Camera The nominal position of the MEMS device is at a point 3 inches above the master hole on baseplate 100, as identified previously in procedure #1. A pair of alignment targets each having a small aperture at a 3" beam height remain in place in baseplate 100 following alignment procedure #1. The two target apertures define the nominal location of a normal axis at the center of the MEMS micro-mirror. Furthermore, the surface of the first target corresponds to the nominal plane position and orientation of the MEMS micro-mirror device, and the small aperture on the target corresponds to the x and y center position of the mirror.

Install a CCD camera on baseplate 100 facing in the direction of the MEMS translator 50. Use a camera mount that can be repeatedly replaced on baseplate 100.

Bring an image of the aperture and the surface of the first target into focus in with the CCD camera. This redefines the axis and x and y reference for the MEMS micro-mirror device to the focal plane of the camera.

Secure the position of the camera.

Note the x and y position of the first target aperture by marking the image of the center position of the reticle grid on the camera display using a marking stylus.

Remove and replace the camera to verify that it can be repeatedly replaced on baseplate 100 and return the x-y position of the first target aperture to its prior position in the focal plane of the camera.

Remove the first target from baseplate 100.

3.) Installation and Initial Alignment of the Surrogate MEMS

Insert the surrogate MEMS/backplate assembly into base 30 on MEMS translator assembly 50. Lock surrogate MEMS into place making sure that all six contact pads are in contact with their respective hard points on base 30.

Using the linear slides on MEMS translator assembly 50, bring the center of the grid on the surrogate MEMS onto the x-y center defined on the CCD display.

Remove the CCD camera and allow the normal laser to reflect off the reticle surface.

Adjust the pitch angle of the reticle with the tilt stage on MEMS translator assembly 50 until the reflected beam is at the same height as the beam emitted from the laser.

Replace the CCD camera and reposition the surrogate MEMS in x and y as needed, as this may have changed when adjusting the pitch angle.

Verify the surface of the grid is in focus and adjust as needed.

Recheck x and y position by repeating the prior two steps.

Remove the CCD camera and verify the incident and reflected beam from the surrogate MEMS are still coincident.

Lock stage on MEMS translator assembly 50.

Remove the surrogate MEMS and replace.

Again, verify x, y, and z position.

Remove CCD camera and verify incident and reflected beams are coincident.

If not, reevaluate alignment.

If everything is in position, then the nominal position of the surrogate MEMS has been established and the surrogate MEMS master has been aligned to a "nominal" reference orientation on baseplate 100. From this point the surrogate MEMS should be handled with care. Be prepared to use the CCD camera in following steps.

AO System Alignment Procedure #7

Matching a MEMS Device to the Surrogate MEMS

In order to adapt the AO system to a functional wave front correcting system, the surrogate MEMS (an optically flat glass microscope reticle) is replaced with an operational MEMS device comprising a deformable micro-mirror array "chip" (hereinafter referred to as a micro-deformable mirror or "MDM").

At the start of the procedure, an identical backplate 20 as that used at the beginning of procedure #0 is prepared. Each of its six contact pads 1–6 will have an initial thickness comprising multiple shims installed between themselves and surfaces 22–24 of backplate 20. The number of shims under each pad will be adjusted to orient and position each MDM mounted on any given backplate, relative to its six points of contact with a given base 30, identical to that of the surrogate MEMS relative to its same six points of contact.

In procedure #0, we described the positioning of the MEMS in x, y, and z-theta. In addition, this procedure will describe matching the position in z, x-theta, and y-theta.

1.) Mounting the MDM System onto a Backplate

This part of the procedure is similar to the procedure used wherein the reticle fixture is attached to its backplate.

The MEMS base master 30 is first set up on a traveling microscope.
Fix the MEMS base master to the traveling microscope.
Place the surrogate MEMS in the MEMS base master and lock down.
Bring the reticle grid into focus in the focal plane of the traveling microscope and nudge the MEMS base master until the grid is aligned in z-theta to the traveling microscope translation stages.
Translate the traveling microscope to the center of the surrogate MEMS grid and zero the scales.

Install six contact pads on one of a backplate 20 with the nominal initial thickness of shim stock at each pad.

Install an MOM card on backplate 20. At each mounting hole, place ⅛" thick spacers between card 13 and backplate 20. Place card 13 onto backplate 20. Insert a #4 washer, a #4 lock washer, over a 4-40×½ long screw into each mount hole on of card 13 in order to hold it in place. Snug the screws just enough to hold the card. The screws will be fully tightened later.

Remove the surrogate MEMS from the MEMS base master

Place the MEMS backplate/card assembly in the MEMS base master 30 and lock into place.

Install the MDM in the zip socket and lock into place.

Bring the surface of the MOM into focus with the microscope (z-position adjustment of backplate 20 will be completed later)

Nudge card 13 on backplate 20 until the center of the MDM corresponds to the zero position and orientation of the traveling microscope.

Tighten the 4-40 screws.
In the configuration shown, the sensitivity of the three translation adjustments is 1:1. For every 0.001" of shim thickness added to pad 2, backplate 20 will rotate 333 micro-radians in the positive x-theta direction and experience an Abbe error of 0.0006" in the negative y-direction. For every 0.001" of shim thickness added to pad 3, backplate 20 will rotate 457 micro-radians in the positive y-theta direction and experience an Abbe error of 0.0008" in the positive x-direction. For every 0.001" of shim thickness removed from pad 6, backplate 20 will rotate 457 micro radians in the positive z-theta direction.

Since x-theta and y-theta are completed first, and x and y translation later, it would be redundant to attempt to correct for the translation coupling. However, if after we set all the pads we find that the tilt is off, it will be useful to take these effects into consideration to minimize the number of steps needed.

2.) Matching the MDM to the Surrogate MEMS in X and Y-theta

Fixture the MEMS base master onto a (white light) interferometer system with the surrogate MEMS installed.

Mount the MEMS base master so that the transverse axes of the surrogate MEMS reticle is parallel to the interferometer (concentric circular fringes).

Remove the surrogate MEMS from the MEMS base master and install a MDM/backplate assembly.

Look at the fringes and add/remove shims under pads 2 and 3 until surfaces are parallel (concentric fringes).

3.) Centering and Orienting the MDM

Place the surrogate MEMS micro-mirror device on the traveling microscope and align to its axes.

Remove the surrogate MEMS and place the MDM/backplate assembly in the MEMS base master.

Translate the traveling microscope to the center of the MDM and note the orientation.

Remove the MDM/backplate assembly and add or remove shims needed to orient the MDM in z-theta.

Replace the assembly and repeat until the MDM is oriented.

Move the traveling microscope to the center of the MDM surface.

Note the new position on the traveling microscope scales.

Remove the assembly and add or remove shims to center the MDM relative to the traveling microscope.

Return the traveling microscope to its zero position.

Replace the MDM assembly and confirm it is centered and oriented. If not, iterate the steps again.

Cross check with surrogate MEMS.

4.) Confirmation of Alignment

After all alignment steps are completed, review and repeat as required all the foregoing procedural steps to confirm the MDM/backplate assembly matches the surrogate MEMS.

What is claimed is:

1. An interchangeable optical mount, comprising:
a base attachable to an optical stage, said base comprising a primary, a secondary and a tertiary datum;
a plurality of forward plates, wherein each of said forward plates comprise a front surface, a rear surface and a fixed number of rear surface structures adapted to communicate with said primary, secondary and tertiary datums;
means for removably joining any one of said forward plates and said base, wherein said rear surface structures are simultaneously brought into contact with said primary, secondary and tertiary datums; and
means for adjusting the height of any of said rear surface structures thereby adjusting and fixing the position and orientation of said front surface in six degrees of freedom.

2. The interchangeable optical mount of claim 1, wherein said base further comprises a rectilinear recess having three orthogonal plane surfaces.

3. The interchangeable optical mount of claim 2, wherein each of said three orthogonal plane surfaces further comprise one or more hardened inserts.

4. The interchangeable optical mount of claim 3, wherein said hardened inserts are all mounted flush to each of said orthogonal plane surfaces.

5. The interchangeable optical mount of claim 4, wherein first, second and third hardened inserts are disposed on a first plane surface adjacent to three of four corners, wherein a first axis passes through a center of each of said first and second hardened inserts and a second axis passes through a center of each of said second and third hardened inserts, and wherein said first and said second axes intersect at a right angle and are respectively parallel to said second and third orthogonal plane surfaces, said first, second and third hardened inserts collectively forming said primary datum.

6. The interchangeable optical mount of claim 5, wherein fourth and fifth hardened inserts are spaced apart and disposed on said second plane surface coaxial with a line parallel to one of said first or second orthogonal axes, said fourth and fifth hardened inserts collectively forming said secondary datum.

7. The interchangeable optical mount of claim 6, wherein a sixth hardened insert is disposed on said third orthogonal plane surface at a point adjacent to the intersection of said first and second orthogonal axes, said sixth hardened insert defining said tertiary datum.

8. The interchangeable optical mount of claim 7, wherein said hardened inserts are further disposed wherein a first virtual plane normal to said secondary datum and passing through said first and second hardened inserts also passes through said sixth hardened insert, and wherein a second virtual plane normal to said tertiary datum and passing through said second and third hardened inserts also passes through said fifth hardened insert.

9. The interchangeable optical mount of claim 1, wherein each of said rear surface structures comprise a threaded contact pad.

10. The interchangeable optical mount of claim 9, wherein said means for adjusting a height of each of said rear surface structures comprises adding or removing one or more shim washers between said threaded contact pad and said rear surface.

11. The interchangeable optical mount of claim 9, wherein each of said threaded contact pads comprises a hemispherical contact end.

12. The interchangeable optical mount of claim 8, wherein an optical element is fixedly mounted about flush to said front surface, said optical element having a normal axis collinear with a line of intersection between said first and said second virtual planes.

13. An instrument mount, comprising:
   a rear plate, comprising
     a recess;
     first, second, and third orthogonal plane surfaces within said recess;
     hardened inserts distributed between and mounted flush on each of said first, second, and third orthogonal plane surfaces, wherein first, second and third hardened inserts are disposed on said first plane surface to form a primary datum, wherein fourth and fifth hardened inserts are disposed on said second plane surface to form a secondary datum, and wherein a sixth hardened inserts is disposed on said third surface to form a tertiary datum;
   a front plate, comprising:
     a front surface;
     a rear surface bossed portion adapted to engage said recess, wherein said bossed portion includes six contact pads distributed between each of three mutually perpendicular surfaces wherein each of said contact pads is disposed at a location on said bossed portion adjacent to a corresponding hardened insert; and
   means for removably securing said front plate against said rear plate, wherein three of said contact pads contact said primary datum, two of said contact pads contact said secondary datum, and said one remaining contact pad contacts said tertiary datum, said six contact pads providing six degrees of freedom in adjusting said front surface position and orientation with respect to said primary, said secondary and said tertiary datums.

14. The instrument mount of claim 13, wherein said first, second and third hardened inserts are disposed on said first plane surface adjacent to three of four corners, wherein a first axis passes through a center of each of said first and second hardened inserts and a second axis passes through a center of each of said second and third hardened inserts, and wherein said first and said second axes intersect at a right angle and are respectively parallel to said second and third orthogonal plane surfaces.

15. The instrument mount of claim 14, wherein fourth and fifth hardened inserts are disposed spaced apart and coaxial with a line parallel to one of said first or second orthogonal axes.

16. The instrument mount of claim 15, wherein said sixth hardened insert is disposed at a point adjacent to the intersection of said first and second orthogonal axes.

17. The instrument mount of claim 16, wherein a first virtual plane normal to said secondary datum and passing through said first and second hardened inserts also passes through said sixth hardened insert, and wherein a second virtual plane normal to said tertiary datum and passing through said second and third hardened inserts also passes through said fifth hardened insert.

18. The instrument mount of claim 13, wherein each of said rear surface structures comprise a threaded contact pad.

19. The instrument mount of claim 18, wherein said means for adjusting a height of each of said rear surface structures comprises adding or removing one or more shim washers between said threaded contact pad and said rear surface.

20. The instrument mount of claim 18, wherein each of said threaded contact pads comprises a hemispherical contact end.

21. The instrument mount of claim 17, wherein an optical element is fixedly mounted about flush to said front surface, said optical element having a normal axis collinear with a line of intersection between said first and said second virtual planes.

22. An adaptive optics system comprising:
   a two-piece optical mount, said optical mount comprising:
     a front plate having a front surface;
     an micro-mirror array fixedly mounted to said front surface;
     means for adjusting the position and orientation of said micro-mirror array with six degrees of freedom,
     a rear plate attachable to an xyz translation stage;
     means for removably securing said front plate against said rear plate, wherein said front plate is repeated removable and replaceable.

23. A method for interchangeably mounting an optical element, comprising the steps of:
   providing a base master tool comprising orthogonal primary, secondary and tertiary datums;
   mounting said base master tool on a traveling microscope to provide a tool assembly and aligning said base master tool to said traveling microscope first and second optical axes;
   providing a first backplate adapted to be held by said base master tool, said first backplate comprising a first front surface, and means for positioning and orienting said first front surface in six degrees of freedom, said means for position and orienting locating said first front surface at a first nominal position and orientation with respect to said orthogonal primary, secondary and tertiary datums;

fixedly installing a reticle onto said first front surface and aligning said reticle with respect to said first and second optical axes to provide a first optical assembly;

mounting said first optical assembly onto said base master tool;

aligning said reticle with respect to said first and second optical axes;

providing an optical bench and a laser mounted on said optical bench;

establishing first and second ends of an optical axis with a light beam emanating from said laser, said first end defined by a distal first target aperture and said second end defined by a proximal second target aperture;

installing said first optical assembly onto said optical bench, wherein said first front surface is located behind and facing said first end;

removing said second target aperture and installing a digital camera opposite said first optical assembly and behind said second end, wherein said digital camera is about coaxial with said normal axis;

bringing said first target aperture into focus in said digital camera focal plane;

removing said first target aperture and re-positioning said first optical assembly in order to bring said reticle into focus within said digital camera focal plane;

removing said digital camera and re-orienting said first optical assembly until said laser light beam is reflected off said reticle and back upon itself;

removing and mounting said first optical assembly onto an interferometry system;

adjusting a position of said first optical assembly until said reticle normal axis is coaxial to said interferometry system;

providing a second backplate adapted to be held by said base master tool, said second backplate comprising a second front surface, and means for positioning and orienting said second front surface in six degrees of freedom, said means for position and orienting locating said second front surface at a second nominal position and orientation with respect to said orthogonal primary, secondary and tertiary datums;

mounting an optical element onto said second front surface to provide a second optical assembly;

replacing said first optical assembly with said second optical assembly;

inspecting said optical element in said interferometry system and adjusting said means for positioning and orienting said second backplate, wherein said step of adjusting rotates said second front surface about axes describing said second surface until said optical element normal axis is shifted coaxial with said interferometry system;

removing and replacing the second optical assembly with said first optical assembly;

mounting said base master tool and said first optical assembly onto a traveling microscope;

bringing said reticle into focus in said traveling microscope focal plane;

removing and replacing the first optical assembly with said second optical assembly; and adjusting said means for positioning and orienting said second backplate, wherein said plane of said optical element is brought to focus in said traveling microscope focal plane.

* * * * *